United States Patent [19]
Pomella et al.

[11] 3,939,390
[45] Feb. 17, 1976

[54] NUMERICAL CONTROL SYSTEM

[75] Inventors: Piero Pomella; Luciano Lauro, both of Ivrea, Italy

[73] Assignee: Ing. C. Olivetti & C., S.p.A., Ivrea (Turin), Italy

[22] Filed: Nov. 14, 1972

[21] Appl. No.: 306,188

Related U.S. Application Data
[63] Continuation of Ser. No. 46,761, June 16, 1970.

[30] Foreign Application Priority Data
June 21, 1969 Italy .................................. 52335/69

[52] U.S. Cl. ............................... 318/604; 318/618
[51] Int. Cl.² ........................................ G05B 19/30
[58] Field of Search .................... 318/618, 635, 604

[56] References Cited
UNITED STATES PATENTS

| | | | |
|---|---|---|---|
| 2,928,033 | 3/1960 | Abbott .............................. 318/604 |
| 3,201,675 | 8/1965 | Curran et al. ................... 318/635 X |
| 3,206,663 | 9/1965 | Neal et al. ........................ 318/635 |
| 3,206,665 | 9/1966 | Burlingham ................... 318/603 X |
| 3,246,223 | 4/1966 | Milenkovic et al. ............ 318/635 X |
| 3,270,260 | 8/1966 | Milenkovic et al. ............ 318/635 X |
| 3,369,160 | 2/1968 | Koppel et al. .................. 318/635 X |
| 3,424,402 | 1/1969 | Bulloch et al. .................. 318/635 X |
| 3,539,897 | 11/1970 | Sommeria .......................... 318/618 |
| 3,566,241 | 2/1971 | Ross ................................ 318/635 X |
| 3,684,940 | 8/1972 | Lutz ................................... 318/635 |

Primary Examiner—T. E. Lynch
Attorney, Agent, or Firm—Schuyler, Birch, Swindler, McKie & Beckett

[57] ABSTRACT

Numerical control means for controlling the position of a machine tool or the like by means of a servomotor are described. A position command signal is compared to the signal indicative of the servomotor position, and the resultant error signal is added to a speed command signal to control the speed of operation of the motor. A follow-up signal is generated whenever the amplitude of the error signal exceeds a predetermined level, and the latter is added to a digital position signal coupled to the system. A constant digital signal generated by said follow up signal is added to said error signal instead of said speed signal.

7 Claims, 1 Drawing Figure

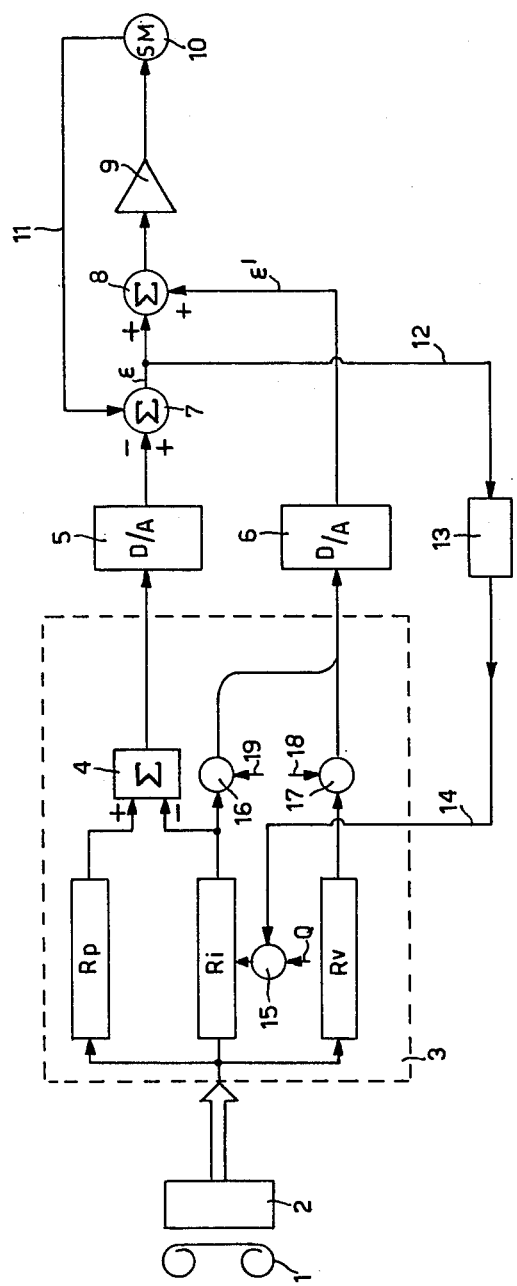

NUMERICAL CONTROL SYSTEM

This is a continuation of application Ser. No. 46,761, filed June 16, 1970.

BACKGROUND OF THE INVENTION

The present invention relates to a system for controlling the position and speed of a moving part in machine tools or other numerically controlled apparatus. In known systems the moving part, positionable along one or each of several axes by means of a separate servomotor, travels along a predetermined continuous path under the control of a series of successive position and speed orders supplied in numerical form by a program unit. Each position order is converted into an analogue signal by a corresponding digital-to-analogue converter and then supplied as a command signal to a position detector adapted to produce an analogue error signal equal to the difference between the current position of the moving part and the position represented by the position order and which controls the speed of the servomotor.

The servomechanisms which carry out the movement along the shifting axes in known systems of this type are normally such as to have a constant error in the output from the position detector with a constant speed of the moving part. Examples of this type are the positioning servomechanisms described in our U.S. Pat. Nos. 3,515,962 and 3,356,994 and U.S. Pat. Application No. 575,802. The first of these patents describes a continuous positioning system in which the program unit is constituted by a program tape on which position orders relating to very closely related positioning points are recorded, a tape reader and registers fed by the reader and adapted to store the successive orders for a time sufficient for the transmission of the respective command to the actuating servomechanism. The second of these patents, on the other hand, describes a continuous positioning arrangement in which the program tape contains only orders relating to discrete points and the tape reader feeds an interpolator adapted to supply as output the orders relating to all the intermediate points included between two successive discrete points of the program.

The position error produced by the position detector cannot exceed a certain value in order not to obtain inaccurate machining and, especially when cyclic position detectors are used, so as not to lose the step between successive nominal positions indicated by the successive positioning orders and actual positions successively attained by the moving part during the shifting thereof.

If we describe as K the ratio between speed and error, that is $V/\epsilon$, in which the speed V may be expressed in mm/sec and the error $\epsilon$ in mm, in known servomechanisms there will be values of the order of 40 for K. Since $\epsilon$ cannot exceed a predetermined value, it is clear that the maximum speed of movement with which it is possible to control the servomotor is rather limited, that is, in the case where $\epsilon$ must not exceed 0.5 mm, it is of the order of 20 mm/sec. On the other hand, in order to obtain higher speeds of movement, it would be necessary to have a larger error signal available.

This disadvantage can be obviated by programming the speed of movement, that is the speed order, in a special way. The speed order, instead of being a particular function which acts on transmission ratios, thus changing the speed of the servomotor, is a numerical value proportional to the absolute value of the speed it is desired to obtain. The speed order, having also been converted into an analogue signal, is added to the analague error signal which commands the servomechanism.

SUMMARY OF THE INVENTION

Thus, according to the principles of the invention, there is provided herein a description of a preferred embodiment of a numerical control system comprising a servomotor for positioning a movable part along a continuous path, a program unit adapted to supply a series of successive position and speed orders in digital form, first and second digital to analogue converters for converting these orders into position and speed command analogue signals respectively, means responsive to the difference between the position command signal and a feedback analogue signal representing the actual position of the movable part along the said path to form an error signal, and means for adding the speed command signal to the error signal to provide a control signal which controls the speed of the servomotor.

Preferably the system comprises a position register and a speed register for storing the said orders, a follow-up register and means for transferring a predetermined numerical quantity thereto whenever the amplitude of the error signal exceeds predetermined level, means for feeding the first converter with the difference between the contents of the position register and the follow-up register, and means for applying the contents of the follow-up register, when these contents are other than zero, to the second converter in lieu of the contents of the speed register.

BRIEF DESCRIPTION OF THE DRAWING

The principles of the invention will be more clearly understood from the following description of a preferred embodiment of the invention given by way of example, with reference to the accompanying drawing, which shows a block diagram of a numerical control system for a machine tool.

DETAILED DESCRIPTION OF THE DRAWING

The program unit of the machine tool includes a program tape 1 on which position and speed orders are recorded. These orders, read by a reader 2, are stored in corresponding registers Rp and Rv of a control unit 3 to be directly transferred as commands to the actuating servomechanism in the case where orders sufficiently close for controlling a movement along a continuous path are concerned, or are processed by means of an interpolator in the control unit in the case where orders relating to discrete points along a continuous path are concerned, in which case the calculation of the orders relating to intermediate points between two successive discrete points is required.

The numerical output of the register Rp for the position orders feeds a digital-to-analogue converter 5, the analogue output signal of which is transferred as command to an error detector or comparison means 7 adapted to produce an error signal $\epsilon$ equal to the difference between the actual position of the moving part of the machine signalled over the channel 11 and the position represented by the position order currently supplied to the detector. The error signal $\epsilon$, suitably amplified by an amplifier 9, is adapted to command the speed of a servomotor 10 which controls the current position signal on the channel 11.

In order to obtain high machining speeds, it would be necessary to have a high error signal ε available, but this could cause inaccuracies of machining. To eliminate this drawback, there is introduced into the system embodying the invention another digital-to-analogue converter 6 fed by the numerical value of the speed register Rv and adapted to supply as output an analogue signal proportional to the speed programmed for the machining. The signal ε' from the converter 6 is added through an adder 8 to the error signal ε, and a signal corresponding to the sum of ε and ε' is coupled to the servomotor 10. In this way, the attainment of high speeds with great precision is rendered possible, inasmuch as operation with a position error signal ε which is small and in any case less than the signal corresponding to the theoretical maximum error is permitted.

This position error intervenes to command the servomechanism when the programmed speed tends progressively towards zero (deceleration phase) and thus guarantees perfect positioning of the moving part at the programmed point of arrival.

The digital-to-analague converter 6 for the speed orders is in general of simpler structure than the converter 5 for the position orders, inasmuch as it acts by simple linear conversion. The converter 5, on the other hand, may be constructed so as to supply at the analogue output particular trigonometrical functions of the numerical position with which it is fed, this being done in dependence upon the structure of the position error detector 7 used in the positioning servomechanism.

It can be observed that in the construction of the control system which has been described so far the closed loop of the servosystem is fed at separate points by the output signals of the converters 5 and 6, but no feedback action of the servosystem into the control unit 3 has been described.

If it is desired to operate with very rapid movements, that is at a speed, for example, of the order of 10 m/min, in the stages of presetting the machining, the correction given by the speed signal ε' would be too great with respect to the maximum error signal ε obtainable from the position detector. In fact, assuming that operation is carried out with a cyclic position detector with a step of 2 mm, the theoretical maximum error is 0.5 mm, while if it is desired to operate at a speed of $V = 12$ m/min $= 200$ mm/sec, for $K = 40$ as already assumed hereinbefore, there is obtained a speed signal $ε' = V/Rv = 200/40 = 5$ mm; that is, the position error signal can be at a maximum equal to 10% of the speed signal.

For rapid movements, a different method of operation is therefore used, in which the moving part is permitted to lag behind with respect to the desired position, even by an amount greater than the maximum theoretical error permitted so as not to lose step. This mode of operation requires that there be auxiliary means which take account of the value of this current position error and allow a readjustment to the programmed nominal position in the phase of deceleration and arrival.

To this end, the system embodying the invention is provided with a special follow-up register Ri incorporated in the control unit 3 and to which a constant numerical quantity Q is transferred under the control of an error meter 13, which monitors the output of error detector 7, whenever the amplitude of the position error produced by the position detector 7 along the line 12 exceeds a given level predetermined by means of a suitable threshold in the error meter 13. Therefore, when the output 14 of the meter 13 is activated, the gate 15 is consequently enabled and permits the transfer of the constant quantity Q to the register Ri, which totals these successively supplied quantities. Furthermore, the error meter 13 is adapted, as well, to detect the sign, in addition to the level, of the error ε and, therefore, to control the transfer of the quantity Q to Ri correspondingly with a positive or negative sign. For example, whenever the position error ε is positive and exceeds $+ 0.125$ mm, a quantity $Q = + 0.125$ mm is sent to Ri, while if the position error ε is negative and below $-0.125$ mm, the quantity $Q = -0.125$ mm will be sent to Ri.

The contents of the registers Rp and Ri are each applied to an adder 4, which forms a difference between the numerical position order contained in Rp and the numerical quantity introduced into Ri before feeding the digital-to-analogue converter 5.

The contents of the follow-up register are moreover sent to the converter 6 in place of the contents of the speed register Rv. This is shown schematically in the drawing by means of gates 16 and 17 which, respectively, control the outputs of the follow-up register Ri and the speed register Rv, as well as one controlled by the program (or interpolating) unit 2, so as to enable gate 16 only during rapid movements and gate 17 only during the working displacements when the speed should be relatively slow and controlled by the programmed (or computed) values introduced into the speed register Rv. Additionally the gate 17 is enabled by the signal 18 only when the contents of the register Ri are nil, while the gate 16 is enabled via line 19 by the presence of a nil speed command in the register Rv.

In this way, there is obtained a position error ε measured by the position error detector 7 which is always small, while the moving part can lag behind with respect to the position command even by several steps of the detector 7. The follow-up register allows the storage of a measure of the current position error to be utilized at the end of the positioning phase for arriving correctly at the predetermined target.

We claim:
1. Apparatus for controlling the speed and position of a machine tool or the like movable along one or more axes by means of a servometer wherein the position and speed information for operating said servometer are obtained in the form of digital signals from a record means, said apparatus comprising:

first converter means for converting said position information obtained in digital signal form from said record means to a first analogue signal corresponding to the desired position of said machine tool, second converter means for converting said speed information obtained in digital form from said record means to a second analogue signal corresponding to the desired speed of said machine tool, adder means for adding said error signal to said second analogue signal and for producing a resultant analogue signal proportional to the sum thereof, means for monitoring the level of said error signal and for producing an output signal responsive to the exceeding by said error signal level of a predetermined threshold level corresponding to said linear range of operation, means for subtracting said monitoring means output signal from said digital position signal obtained from said record means, the resulting signal being converted in said first converter means to an analogue signal to replace said first analogue signal in said detector means for maintaining the detector means in said linear range, means for coupling said output signal from said monitoring means to said second converter means to produce an analogue signal to be coupled to said adder means instead of said second analogue signal when said speed digital signal is nil, and means for coupling said speed digital signal to said converter means when said output signal from said monitoring means is nil.

2. The apparatus defined in claim 1 wherein said monitoring means is adapted to produce an output signal including information as to the algebraic sign of the error signal emanating from said detector means.

3. Apparatus for controlling the speed and position of a machine tool or the like movable along a predetermined path, by means of a servomotor, wherein the information as to the desired speed and position are obtained from a record member in the form of digital signals, said apparatus comprising:

first register means for receiving and storing digital signals indicative of the desired position of said machine tool, second register means for receiving and storing digital signals indicative of the desired speed of said machine tool, first converter means for converting the digital information stored in said first register into a first analogue signal proportional thereto, second converter means for converting the digital information stored in said second register into a second analogue signal proportional thereto, error detector means for producing an output error signal indicative of the difference between said first analogue signal and an analogue signal obtained from and indicative of the position of said servomotor, said detector means being of the cyclic type, whereby said error signal assumes identical values for any position of said servomotor differing from each other by a multiple of a predetermined pitch, and having within one pitch a substantially linear range of operation where said error signal is proportional to said difference, first adder means for producing a control signal indicative of the sum of said error signal and said second analogue signal, said control signal being coupled to said servomotor to control the speed of operation of same, third register means for receiving and registering a digital quantity, level detector means for producing an output when said error signal exceeds a predetermined threshold level corresponding to said linear range of operation, means for applying said digital quantity to said third register in response to said level detector output, second adder means for producing a digital signal coupled to said first converter means, which digital signal is the sum of the digital position signal stored by said first register means, and the digital quantity in said third register means, means for coupling the output of said third register to said second converter means when the content of said second register means is nil, and means for coupling the speed digital signal stored by said second register to said second converter means when the content of said third register means is nil.

4. The apparatus defined in claim 3 wherein said first converter means is adapted to produce an analogue output which is a predetermined trigonometrical function of the digital input thereto, and wherein said second converter means is adapted to produce an analogue output which is a linear function of the digital input thereto.

5. The apparatus defined in claim 1 wherein said output signal from said monitoring means is in the form of a constant digital quantity.

6. The apparatus defined in claim 1, wherein said monitoring means is adapted to produce a numerical output signal representing a fixed quantity provided with a positive or a negative sign according to the algebraic sign of said error signal, and comprising follow-up means for algebraically integrating said fixed quantity each time said monitoring means produces said output signal.

7. The apparatus defined in claim 3, wherein said third register is adapted to supply to said first converter said digital quantity and to store up to a predetermined multiple of said quantity, and said level detector means produces said output with a sign corresponding to the sign of said error signal, and comprising means for conditioning said applying means to apply said quantity to said third register each time said level detector produces said output so as to be algebraically integrated according to the sign of said error signal, whereby said second adder means algebraically adds to said digital position the content of said third register.

* * * * *